US007835904B2

(12) United States Patent
Li et al.

(10) Patent No.: US 7,835,904 B2
(45) Date of Patent: Nov. 16, 2010

(54) PERCEPTUAL, SCALABLE AUDIO COMPRESSION

(75) Inventors: Jin Li, Sammamish, WA (US); James Johnston, Redmond, WA (US); Wai Yip Chan, Kingston (CA)

(73) Assignee: Microsoft Corp., Redmond, WA (US)

( * ) Notice: Subject to any disclaimer, the term of this patent is extended or adjusted under 35 U.S.C. 154(b) by 1293 days.

(21) Appl. No.: 11/367,886

(22) Filed: Mar. 3, 2006

(65) Prior Publication Data

US 2007/0208557 A1 Sep. 6, 2007

(51) Int. Cl.
*G10L 19/02* (2006.01)
*H04B 1/66* (2006.01)

(52) U.S. Cl. ..................... 704/200.1; 704/229; 704/501

(58) Field of Classification Search ............. 704/200.1, 704/220, 229, 230, 500, 501
See application file for complete search history.

(56) References Cited

U.S. PATENT DOCUMENTS

| | | | | |
|---|---|---|---|---|
| 5,627,938 | A * | 5/1997 | Johnston | 704/200.1 |
| 5,852,806 | A * | 12/1998 | Johnston et al. | 704/230 |
| 5,886,276 | A * | 3/1999 | Levine et al. | 84/603 |
| 6,092,041 | A * | 7/2000 | Pan et al. | 704/229 |
| 6,094,636 | A * | 7/2000 | Kim | 704/500 |
| 6,115,688 | A * | 9/2000 | Brandenburg et al. | 704/503 |
| 6,226,616 | B1 * | 5/2001 | You et al. | 704/500 |
| 6,246,345 | B1 * | 6/2001 | Davidson et al. | 341/51 |
| 6,363,338 | B1 * | 3/2002 | Ubale et al. | 704/200.1 |
| 6,370,507 | B1 * | 4/2002 | Grill et al. | 704/500 |
| 6,424,939 | B1 * | 7/2002 | Herre et al. | 704/219 |
| 6,446,037 | B1 * | 9/2002 | Fielder et al. | 704/229 |
| 6,947,886 | B2 * | 9/2005 | Rose et al. | 704/200.1 |
| 6,950,794 | B1 * | 9/2005 | Subramaniam et al. | 704/200.1 |
| 7,212,973 | B2 * | 5/2007 | Toyama et al. | 704/500 |
| 7,277,849 | B2 * | 10/2007 | Streich et al. | 704/229 |
| 7,409,350 | B2 * | 8/2008 | Hsu | 704/501 |
| 7,512,539 | B2 * | 3/2009 | Geiger et al. | 704/500 |
| 2002/0107686 | A1 * | 8/2002 | Unno | 704/219 |
| 2003/0171920 | A1 * | 9/2003 | Zhou et al. | 704/230 |
| 2006/0190247 | A1 * | 8/2006 | Lindblom | 704/230 |
| 2006/0235678 | A1 * | 10/2006 | Kim et al. | 704/200.1 |

(Continued)

OTHER PUBLICATIONS

Bosi, M., ISO/IEC MPEG-2 advanced audio coding, J. of Audio Eng'g Soc., Oct. 1997, vol. 45, No. 10, pp. 789-814.

(Continued)

*Primary Examiner*—Martin Lerner
(74) *Attorney, Agent, or Firm*—Lyon & Harr, LLP; Katrina A. Lyon

(57) ABSTRACT

The perceptual scalable audio coding/decoding technique lies in the use of a psychoacoustic mask to guide residue coding in enhancement layer coders. At the encoder, a psychoacoustic mask is calculated for the enhancement layer coders or is simply extracted from the coded base layer bitstream. One can also decode the coded base layer bitstream into the audio waveform, and calculate the psychoacoustic mask from the decoded base layer waveform. Furthermore, a predictive technology can be used to refine the psychoacoustic mask derived from the base layer bitstream to form a more accurate psychoacoustic mask of the enhancement layer. In addition, one can calculate the enhancement layer psychoacoustic mask from the original audio, and send the difference between the enhancement layer psychoacoustic mask and the base layer psychoacoustic mask as side information to the decoder. This psychoacoustic mask may then be used for the perceptual coding and decoding of the residue.

19 Claims, 11 Drawing Sheets

U.S. PATENT DOCUMENTS

2009/0076801 A1 * 3/2009 Neubauer et al. ........ 704/200.1

OTHER PUBLICATIONS

Li, J., Embedded audio coding (EAC) with implicit psychoacoustic masking, ACM Multimedia, Dec. 1-6, 2002, pp. 592-601, Nice, France.

Nishiguchi M., A. Inoue, Y. Maeda, J. Matsumoto, Parametric speech coding—HVXC at 2.0-4.0 kbps, IEEE Workshop on Speech Coding, Jun. 1999, pp. 84 to 86.

Vocal Technologies Ltd., G.722.2, Adaptive multi-rate wideband AMR-WB Vocoder Algorithm, 2004, One Page.

Yu, R., X. Lin, S. Rahardja, C. C. Ko, A scalable lossy to lossless audio coder for MPEG-4 lossless audio coding, *IEEE Conf. on Acoustics, Speech and Signal Processing*, May 2004, vol. 3, pp. 1004-1007.

Ziegler, T., A. Ehret, P. Ekstrand, and M. Lutzky, Enhancing MP3 with SBR: Features and capabilities of the new MP3PRO algorithm, AES 112th Convention, AES preprint 5560, Munich, Germany, 2002.

* cited by examiner example of band-limiting of a typical signal

PERCEPTUAL, SCALABLE AUDIO COMPRESSION

BACKGROUND

A particularly attractive feature of audio codec is scalability. In general, a scalable audio codec compresses the incoming audio into a master bitstream, which may or may not include a non-scalable base layer. Later, a parser may quickly extract from the master compressed file a subset of the bitstream and form an application bitstream at a low bitrate, of a smaller number of channels, or at a reduced audio sampling rate, or a combination of any of the above. Scalable audio compression greatly eases the design constraints of many systems that utilize audio compression. In many applications, it is difficult to foresee the exact compression ratio required at the time the audio is compressed. The ability to quickly change the compression ratio may lead to a better user experience in audio storage and transmission. For example, if the compression ratio of the stored audio is adjustable, the compressed audio can be further compacted to meet the exact requirements of the customer. One can build a stretchable audio recording device, which at first, uses the highest possible compression quality (lowest possible compression ratio) to store the compressed audio. Later, when the length of the compressed audio at the highest quality exceeds the memory of the device, the compressed bitstream of the existing audio file can be truncated and leave memory for newly recorded audio content. A device with scalable audio compression technology can perform this stretching step again and again, continuously increasing the compression ratio of the existing media, freeing up the storage space and squeezing in new content. The ability to quickly adjust the compression ratio is also very useful in the media communication/streaming scenario, where the server and the client may adjust the size of the compressed audio to match the instantaneous bandwidth and condition of the network, and thus reliably deliver the best possible quality of the compressed media over network. Moreover, multiple description coding may also be applied on a scalable coded audio bitstream. The idea is to apply more protection (using forward error correction of several sorts) to the more important part of the bitstream (base layer), and to apply less protection to the less important part of the bitstream (enhancement layer). Thus, even with a large number of lost packets, the head portion of the compressed bitstream is preserved. As a result, the quality of the delivered audio degrades gracefully with an increase in the packet loss ratio.

An existing set of scalable audio tools provides various levels of scalability. The following paragraphs review a selected set of scalable audio configurations. The scalable audio tools are divided into three major groups: the pure bit-scalable audio coders, the parametric scalable audio coders, and the enhancement layer scalable audio coders.

A. Pure Bit-Scalable Audio Coders:

Two types of pure bit-scalable audio coding are BSAC (Bit sliced arithmetic coding) and Progressive-to-lossless embedded audio codec (PLEAC). In BSAC, by replacing the entropy coding core of the Advanced Audio Coding (AAC) codec with a bitplane arithmetic codec, fine grain scalability (with steps down to 1 kbps per channel) can be achieved. PLEAC is a highly flexible embedded audio coder that is capable of scaling from low bitrate all the way to lossless.

Both BSAC and PLEAC are pure bit-scalable audio coders. They do not support the use of a non-scalable base layer coder. Within the coder, they use certain gradual refinement approaches, e.g., bitplane coding (in BSAC) and sub-bitplane coding with psychoacoustic order (in PLEAC) to gradually refine the audio transform coefficients. Though the perceptual audio compression performance of these pure scalable audio coders can be satisfactory across a large bitrate range, at certain bitrate points, specifically at low bitrates, its performance may be inferior to a highly optimized non-scalable audio coder designed to operate at that bitrate. Such performance difference between the scalable and the non-scalable audio coder at low bitrates may hamper the adoption of the scalable audio coder and prevent the scalable audio coder from being used by many applications.

In many applications, very low audio quality is not acceptable, and scalability at low bit rates may not be needed. In such case, a non-scalable base-layer codec may be more efficient. A scalable codec operating on top of the base layer can be used, as will be discussed relative to enhancement layer scalable audio coding below. The existence of a base layer also allows providers, deliverers, creators, and other people who handle content to ensure a minimum quality.

The inefficiency of scalable codecs at low-bit-rates may be due to several causes including: (a) the perceptual distortion model and (b) the quantizer (which could be construed as combining signal representation, quantization, and coding.). For the perceptual distortion model, it is known that at very low bit rates, vector quantization (VQ) provides superior R-D performance. However, at high bitrates, the scalar quantizer (SQ) codec is preferred for low implementation complexity. It is difficult to build an integrated scalable codec with VQ at lower bitrates, and SQ at higher bitrates. For the quantizer, the traditional approach of calculating the masking threshold based on the input audio signal breaks down for low-bit-rate/low-quality-level coding. The alternate approach used in PLEAC lets the masking threshold be updated during the encoding process. This approach also breaks down for low-bit-rate/low-quality-level coding, as the low bit rate decoded audio signal does not have sufficient information to derive an accurate masking threshold.

B. Parametric Scalable Audio Coders.

Parametric scalable audio coding schemes include AAC+ parametric coding, scalable natural speech and parametric audio coding tools. These will be discussed in the following paragraphs.

AAC+ parametric coding, such as MPEG-4 audio, provides tools for enhancing the compression performance of the AAC-based codec by parametric coding approaches. Spectral Band Replication (SBR) synthesizes the high-frequency range of the audio signal based on the transmitted band-limited audio signal and some small side information. Parametric Stereo (PS) allows the synthesis of a stereo output based on a transmitted monophonic signal and some small amount of side information. Both SBR and PS tools allow the audio to scale beyond what is coded in the base layer. However, there are limitations on the achievable quality improvements using the SBR and PS tools, and they are not presently effective when very high audio quality is required.

Scalable natural speech coding schemes include Harmonic Vector Excitation Coding (HVXC), Code Excited Linear Prediction (CELP) and parametric audio coding tools such as Harmonic and Individual Lines and Noise (HILN) coding. Within a single coding scheme of HVXC, CELP, or HILN, MPEG-4 can also provide a certain degree of scalability. HVXC and CELP provide scalability in 2 kbps steps for narrowband (8 kHz sampling) speech. CELP also allows bandwidth scalability from narrowband speech to wideband (16 kHz sampling) speech using a 10 kbps enhancement layer. HILN provides scalable configurations with a base layer and one or more additional extension layers.

In general, a parametric scalable audio coding approach may be used to enhance the performance of the base layer coder. All the above scalability tools can only achieve Large Step (or coarse grain) scalability. Moreover, there is no tool that allows the coded bitstream to scale from the low bitrate parametric audio coding to the more generic waveform audio coding. As a result, parametric scalable audio coders do not scale all the way to perceptual lossless or true lossless.

C. Enhancement Layer Scalable Audio Coders.

Two types of enhancement layer scalable audio codecs include scalable MC and scalable towards high quality/lossless schemes.

In scalable MC, several stages of MC codec can be cascaded to achieve so-called Large Step Scalability (e.g. 8 kbps steps). This approach achieves good compression performance at the base layer. However, the performance degrades with the increase of the number of stages. There are two main shortcomings of the approach. First, each encoding layer of scalable MC re-quantizes the reconstruction error of the preceding layer using a nonuniform quantizer and a quantization step size that is a power of 2^(¼). Second, the source coder of MC is optimized to encode the quantized coefficients of the base layer. It is far from optimal in encoding the residue error in the enhancement layer. Because of both, scalable MC's performance is well below that of non-scalable MC at any rate beyond the base-layer rate.

One scalable towards high quality/lossless coding scheme, the Scalable Lossless Coding (SLS) scheme, is designed to provide fine-granular enhancement up to lossless reconstruction. In short, the key here is to replace the float Modified Discrete Cosine Transform (MDCT) with a low noise MDCT, and then use an entropy coder that can code the coefficients all the way to the lossless. As scalable MC, SLS yields scalability only in the mean squared error (MSE) sense and not the perceptual sense.

Both enhancement layer scalable audio coders above employ a good non-scalable audio coder as the base layer. Then, the residue between the decoded base layer audio and the original audio are encoded (in large step refinement or fine grain refinement) by an enhancement layer coder. What is significant and missing among the existing scalable audio coding approaches is the use of the psychoacoustic information embedded in the base layer and/or the error signal to guide the scalable coding for the enhancement layer, thereby achieving not MSE scalability, but perceptual scalability. Moreover, as enhancement information is added, additional psychoacoustic information may be available, but is not used to guide the formation of additional enhancement information.

SUMMARY

Human psychoacoustic characteristics play an important role in audio coding. By devoting fewer bits to the components that are less audible by the human ear, and more bits to the psychoacoustically sensitive components, it is possible to greatly improve the quality of the coded audio. Though several enhancement layer scalable audio compression tools are available today, they all use a non-perceptual approach when improving upon the base layer coded audio. A perceptually scalable approach can greatly improve the audio quality from the bitrate of the base layer coder to the bitrate of perceptual lossless coder, and reduce the bitrate needed to reach perceptual lossless quality.

The present perceptual scalable audio coding and decoding technique takes the psychoacoustic information in the base layer and/or the error signal of an audio signal into consideration for use in the enhancement layer coding of residue signals. This perceptual scalable audio coding technique provides greatly improved performance for enhancement layer based scalable audio coders, compared to coders that do not use psychoacoustic information in the enhancement layer(s).

The perceptual scalable audio coding and decoding technique lies in the addition of a psychoacoustic masking module and the subsequent use of the psychoacoustic masking module to guide residue coding in the enhancement layer coder or coders. At the encoder, a psychoacoustic masking level is calculated or extracted from the coded base layer bitstream or error signal. This psychoacoustic masking level may then be used to guide the perceptual coding of the residue. At the decoder, the same psychoacoustic mask is extracted from the coded base layer bitstream and used to perceptually decode the residue.

At the encoder, in one embodiment, the psychoacoustic mask can simply be extracted from the coded base layer bitstream. In another embodiment, the perceptual scalable audio coder can decode the coded base layer bitstream into the audio waveform, and calculate the psychoacoustic mask from the decoded base layer waveform. In another embodiment a predictive technology is used to refine the psychoacoustic mask derived from the base layer bitstream to form a more accurate psychoacoustic mask of the enhancement layer. In addition, in yet another embodiment, the system can calculate the enhancement layer psychoacoustic mask from the original audio signal, and send the difference between the enhancement layer psychoacoustic mask and the base layer psychoacoustic mask as side information to the decoder. This psychoacoustic mask may then be used to guide the perceptual coding of the residue.

Compared with not using psychoacoustic information in the coding of residue, the perceptual scalable audio coding and decoding technique provides much better perceptual coding quality for the enhancement layer coding. The use of psychoacoustic masking in the enhancement layer(s) also allows the coder to adjust bandwidth and pre-echo suppression to desirable levels while doing non-transparent coding, allowing tradeoffs in the enhancement layer(s) that depend on bitrate and the quality of the base layer.

It is noted that while the foregoing limitations in existing scalable audio coders described in the Background section can be resolved by a particular implementation of the perceptual scalable audio coding and decoding system described, this system and process is in no way limited to implementations that just solve any or all of the noted disadvantages. Rather, the present system and process has a much wider application as will become evident from the descriptions to follow.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWINGS

The specific features, aspects, and advantages of the invention will become better understood with regard to the following description, appended claims, and accompanying drawings where:

DETAILED DESCRIPTION

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 The Computing Environment

Before providing a description of embodiments of the present perceptual scalable audio coding and decoding technique, a brief, general description of a suitable computing environment in which portions of the technique may be implemented will be described. The technique is operational with numerous general purpose or special purpose computing system environments or configurations. Examples of well known computing systems, environments, and/or configurations that may be suitable for use with the process include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
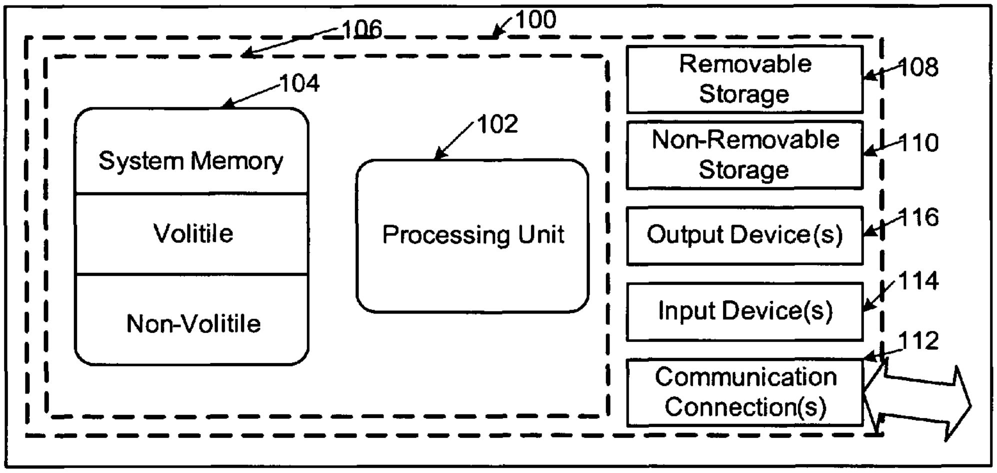
FIG. 1 is a diagram depicting a general purpose computing device constituting an exemplary system for implementing the present perceptual scalable audio coder.

FIG. 1 illustrates an example of a suitable computing system environment. The computing system environment is only one example of a suitable computing environment and is not intended to suggest any limitation as to the scope of use or functionality of the present system and process. Neither should the computing environment be interpreted as having any dependency or requirement relating to any one or combination of components illustrated in the exemplary operating environment. With reference to FIG. 1, an exemplary system for implementing the present process includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

The present process may be described in the general context of computer-executable instructions, such as program modules, being executed by a computing device. Generally, program modules include routines, programs, objects, components, data structures, etc. that perform particular tasks or implement particular abstract data types. The process may also be practiced in distributed computing environments where tasks are performed by remote processing devices that are linked through a communications network. In a distributed computing environment, program modules may be located in both local and remote computer storage media including memory storage devices.

2.0 Psychoacoustic Masking.

Psychoacoustic masking is well known to those skilled in the art. Consequently, the basic theory behind acoustic or auditory masking will only be described in general terms below. This discussion is not meant to be exhaustive. In general, the basic theory behind psychoacoustic or auditory masking is that humans do not have the ability to hear minute differences in frequency or amplitude. For example, it is very difficult to discern the difference between a 1,000 Hz signal and a signal that is 1,001 Hz. It becomes even more difficult for a human to differentiate such signals if the two signals are playing at the same time such that they overlap. Further, studies have shown the 1,000 Hz signal would also affect a human's ability to hear a signal that is 1,010 Hz, or 1,100 Hz, or 990 Hz. This concept is known as masking. If the 1,000 Hz signal is strong, it will mask signals at nearby frequencies, making them inaudible to the listener. In addition, there are other types of auditory or acoustic masking which effect human auditory perception. In particular, as discussed below, both temporal masking and noise masking also effect human audio perception. In particular, temporal masking of coding noise and masking of coding noise by the original signal are used in a perceptual coder in order to render the coded signal indistinguishable or not very different than the original. These ideas are used to improve audio compression because information that is not perceptible due to masking can be removed from the signal, thereby saving bits without substantially affecting quality.

In particular, the human ear does not respond equally to all frequency components. The auditory system can be roughly divided into 26 "critical bands," each of which can be modeled as a band-pass filter-bank with a bandwidth on the order of 50 to 100 Hz for signals below 500 Hz, and up to 5000 Hz for signals at higher frequencies. The human ear consists of a time/frequency analyzer (the cochlea). On the cochlea, acoustic signals are converted into nerve impulses by a filter bank implemented along the organ of Corti. This organ implements a filter bank with a continuously varying center frequency. The bandwidth of the filters thus created is roughly 100 Hz at low frequencies, and about ⅓ octave at high frequencies, converting smoothly from equal spacing to log spacing in the 500 Hz to 1 kHz range. Within each critical band, an auditory masking threshold, which is also referred as the psychoacoustic masking threshold or the threshold of the just noticeable distortion (JND), can be determined. Audio signals and coding noise with energy level below the threshold will not be audible to a human listener.

Figure 2:
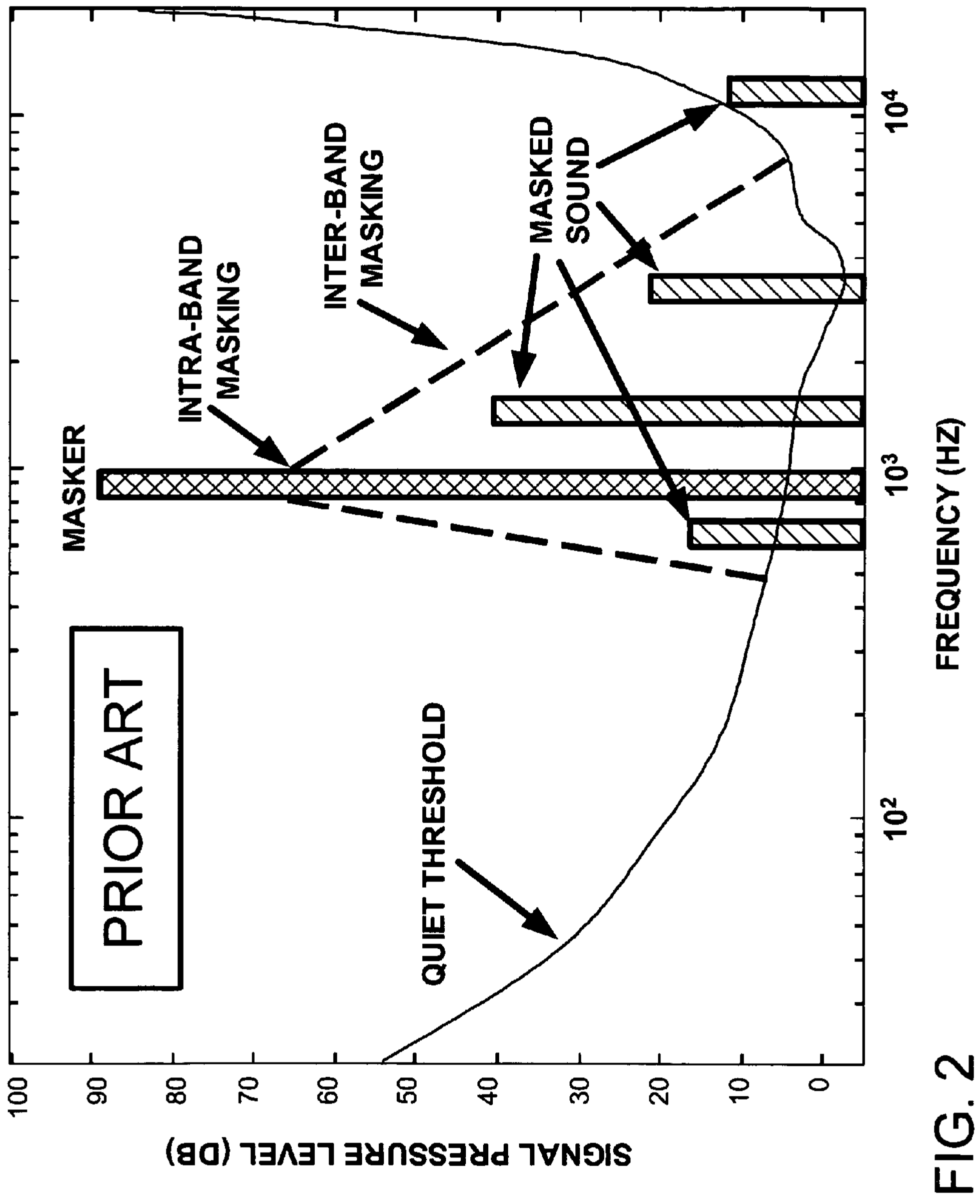
FIG. 2 is a graph depicting the sensitivity of the human auditory system for a critical band k without the presence of any audio signal.

These ideas can be further explained by examining the auditory masking threshold $TH_{i,k}$ of a critical band k at time instance i. The combined auditory masking threshold $TH_{i,k}$ can be calculated as a combination of a "quiet threshold," i.e., the threshold below which a particular audio component is inaudible to a human listener, an intra-band threshold, an inter-band threshold (based on masking due to the cochlear excitation both within and outside the critical band centered on any given frequency) and a temporal masking threshold (based on a masking factor remaining from prior cochlear excitation). The quiet threshold $TH\_ST_k$ describes the sensitivity of the human auditory system for a critical band k without the presence of any audio signal. It is described by the zero-loudness curve, such as a conventional Fletcher-Munson curve, as illustrated in FIG. 2. As can be seen from FIG. 2, the sensitivity of the human ear is approximately linear for a relatively large range (1 kHz to 8 kHz), and then drops dramatically above 10 kHz and below 500 Hz.

As further illustrated by FIG. 2, a low-level signal (the probe) can be made inaudible by a simultaneously occurring strong signal (the masker) as long as the masker and the probe are close enough to each other in frequency. The simultaneous masking is larger in the critical band where the masker is located, and is smaller in the higher frequency neighboring critical band. The auditory masking of the same critical band is known as "intra-band masking," while the masking of the neighboring critical band is known as "inter-band masking." As is well known to those skilled in the art, the intra-band masking threshold $TH\_INTRA_{i,k}$ is directly proportional to the energy of the signal in the critical band $AVE_{i,k}$, and can be calculated as illustrated by Equation 1:

$$TH\_INTRA_{i,k}(\text{dB})=AVE_{i,k}(\text{dB})-R_{fac} \qquad \text{Equation 1}$$

where $R_{fac}$ is assumed to be a constant offset value.

As noted above, a strong audio signal, i.e., the masker, also masks small signals in the neighboring critical band. The inter-band masking threshold $TH\_INTER_{i,k}$ that governs the masking of neighboring critical bands is illustrated by Equation 2:

$$TH\_INTER_{i,k}=\max(TH_{i,k-1}-R_{high}, TH_{i,k+1}-R_{low}) \qquad \text{Equation 2}$$

where $R_{high}$ and $R_{low}$ are attenuation factors towards the high-frequency and low-frequency critical bands, respectively. As illustrated by FIG. 2, the attenuation of the masking threshold is steeper towards lower frequency bands, thus the value $R_{low}$ is larger than $R_{high}$, and the high frequency coefficients are more easily masked. The combined quiet, intra- and inter-auditory masking thresholds for a strong masker signal is illustrated in FIG. 2. The dashed line shows the auditory masking threshold created by the audio signal identified as the "Masker." Any sound signal, including compression errors and noise, below the masking threshold will not be audible by human ears.

Figure 3:
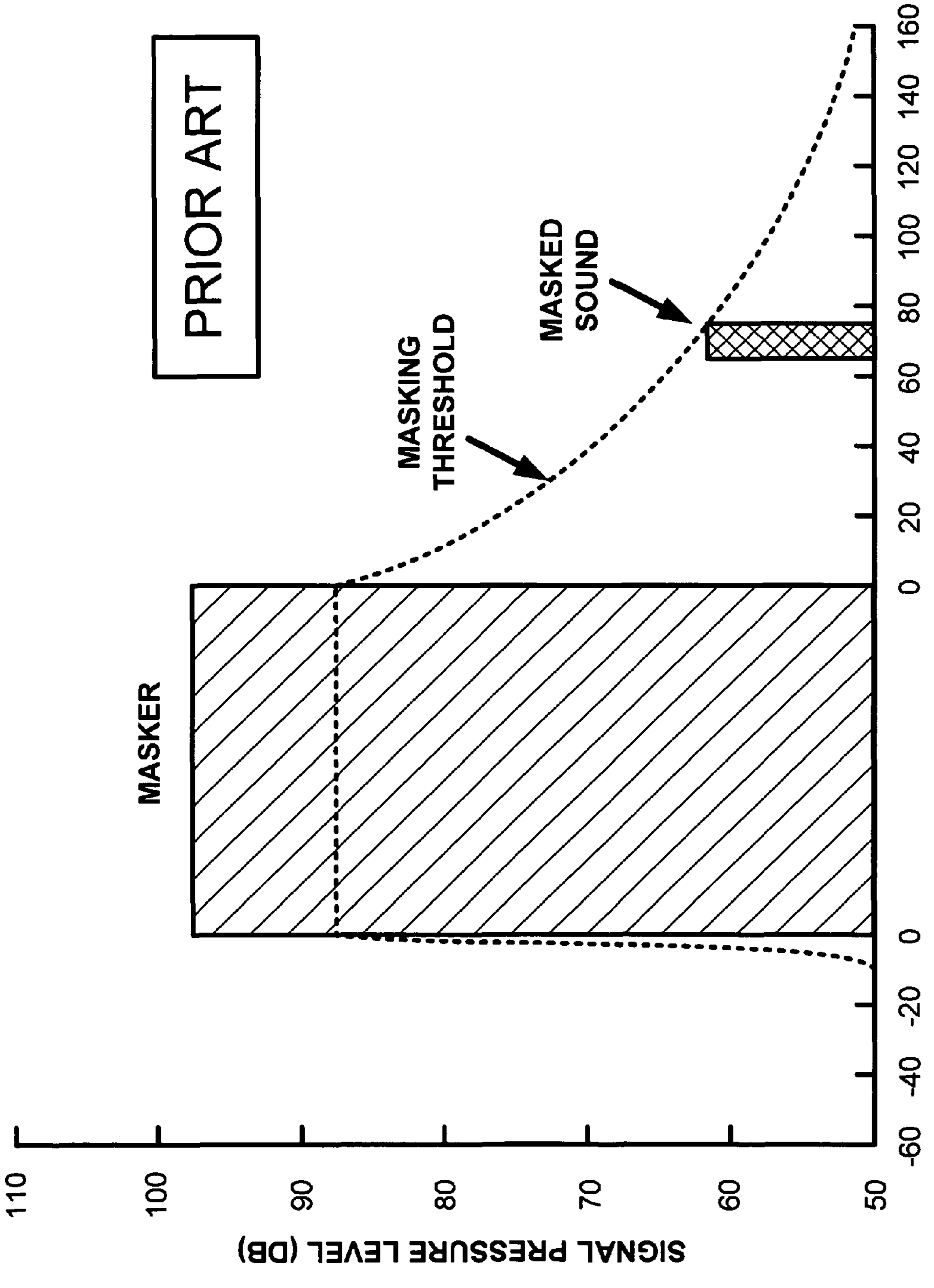
FIG. 3 is a graph depicting a sample temporal masking threshold

Further, as is well known to those skilled in the art, according to psychoacoustic masking theory, auditory masking can also occur with an audio component immediately temporally proceeding or following a strong signal, i.e., the masker. This effect is called temporal masking. The duration within which premasking applies is very short, while postmasking can be measured out to 50 to 200 ms. The temporal masking threshold $TH\_TIME_{i,k}$ can be calculated as illustrated by Equation 3:

$$TH\_TIME_{i,k}=\max(TH_{i-1,k}-R_{post}, TH_{i+1,k}-R_{pre}) \qquad \text{Equation 3}$$

where $R_{pre}$ and $R_{post}$ are attenuation factors for the proceeding and following time intervals, respectively. A sample temporal masking threshold is illustrated in FIG. 3.

A combined auditory masking threshold is the combined maximum of the quiet, intra- and inter-band masking thresholds as illustrated by Equation 4:

$$TH_{i,k}=\max(TH\_ST_k, TH\_INTRA_{i,k}, TH\_INTER_{i,k}, TH\_TIME_{i,k}) \qquad \text{Equation 4}$$

This combined masking threshold is easily determined through an iterative calculation of Equations 2 through 4. In other words, the effect of the combined masking threshold is that if an audio signal consists of several strong maskers, the combined masking threshold is the maximum of each individual masking threshold.

The specific psychoacoustic masking calculation technology used can vary from one audio coder to another. Nevertheless, all psychoacoustic masking calculations have one or more components of quiet, intra- and inter-band masking, and temporal masking. Most well-known psychoacoustic models use interband spreading, a lower limit of resolution (in place of an absolute threshold, to accommodate volume controls), and some kind of critical band analysis. Some may replace the critical band analysis and spreading with a cochlear excitation analysis.

The exemplary operating environment having now been discussed, the remaining parts of this description section will be devoted to a description of the program modules embodying the invention.

3.0 Perceptually Scalable Audio Compression.

Figure 4:
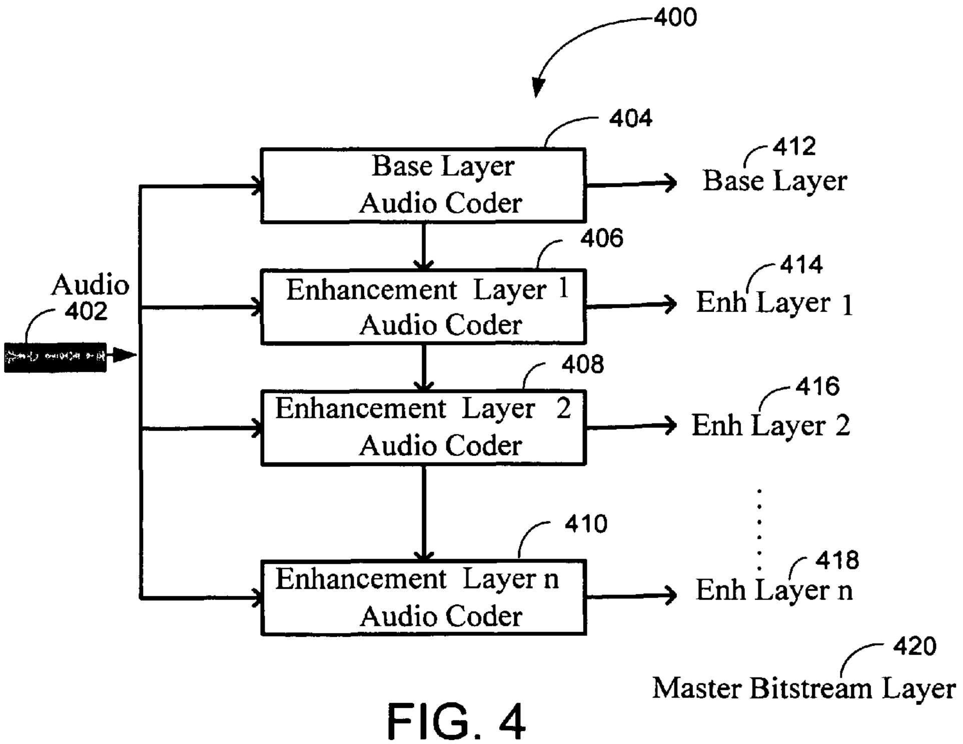
FIG. 4 depicts the typical framework of enhancement layer scalable audio compression.

The generic framework of a typical enhancement layer scalable audio coder 400 is shown in FIG. 4. The original audio 402 is encoded by a base layer audio coder 404. Then one or more enhancement layer coders 406, 408, 410 are employed. The coding result of the base layer bitstream 412 is fed into the enhancement layer coder 406 to calculate a residue. The enhancement layer coder 406 then encodes the residue and generates an enhancement layer bitstream 414. The process can be repeated to generate multiple enhancement layers. For example, the enhancement layer 2 coder 408 takes the coding result of the enhancement layer 1 coder 414 as the base layer bitstream, calculates the residue, and then generates the enhancement layer 2 bitstream 416. The enhancement layer 3 coder 410 takes the coding result of the enhancement layer 2 coder 416 as the base layer, and so on. The base layer bitstream and multiple enhancement layer bitstreams form a scalable bitstream with Large Step (coarse-grain) scalability, shown in FIG. 4 as the master bitstream layer 420. If the enhancement layer bitstream is an embedded bit stream obtained via certain gradual refinement approaches, one may achieve fine-grain scalability by partially truncating an enhancement layer bitstream.

Figure 5:
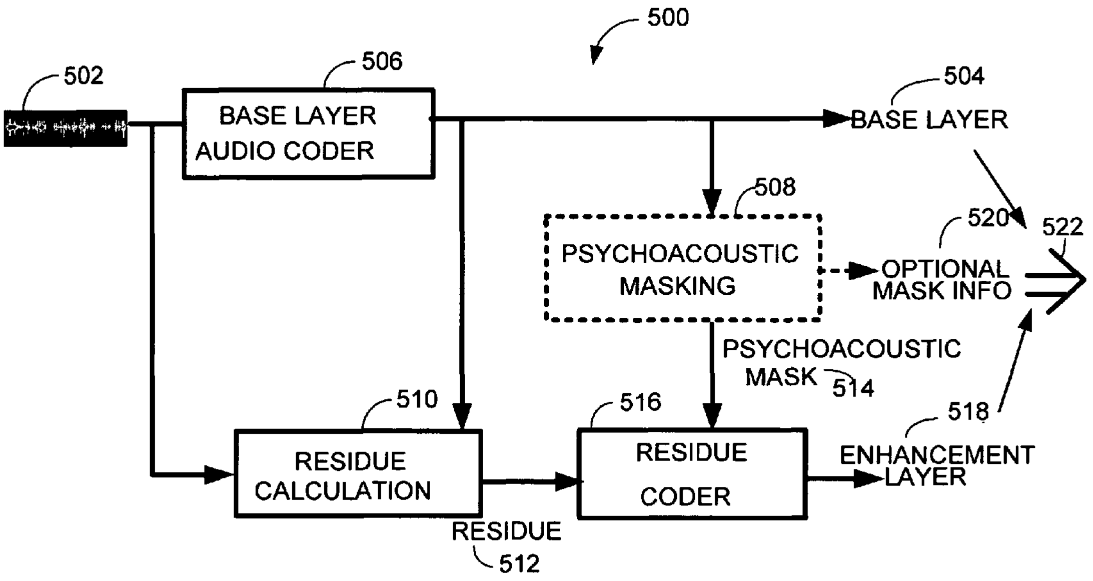
FIG. 5 depicts an exemplary system diagram of one embodiment of the present perceptual scalable audio coder.

The present perceptual scalable audio coding and decoding technique lies in the addition of a psychoacoustic masking module and the subsequent use of the psychoacoustic mask to guide residue coding in the enhancement layer coders. One embodiment of the perceptual scalable audio coder 500 is in FIG. 5. In particular, the psychoacoustic mask module 508 is unique (marked with a dashed line). From the input audio signal 502, the base layer coder 506 creates the base layer bitstream 504 and the residue 512 is calculated by the residue calculation module 510. A psychoacoustic mask 514 is obtained from the coded base layer bitstream 504 that is coded by the base layer coder 506. This psychoacoustic mask 514 may then be used to guide the perceptual coding of the residue by the residue coder 516 to create the enhancement layer bitstream 518. The base layer bitstream 504 and enhancement layer bitstream 518 then provide the perceptual scalable audio bitstream 522. Optionally psychoacoustic mask information 520 may also be included in this bitstream.

Figure 6:
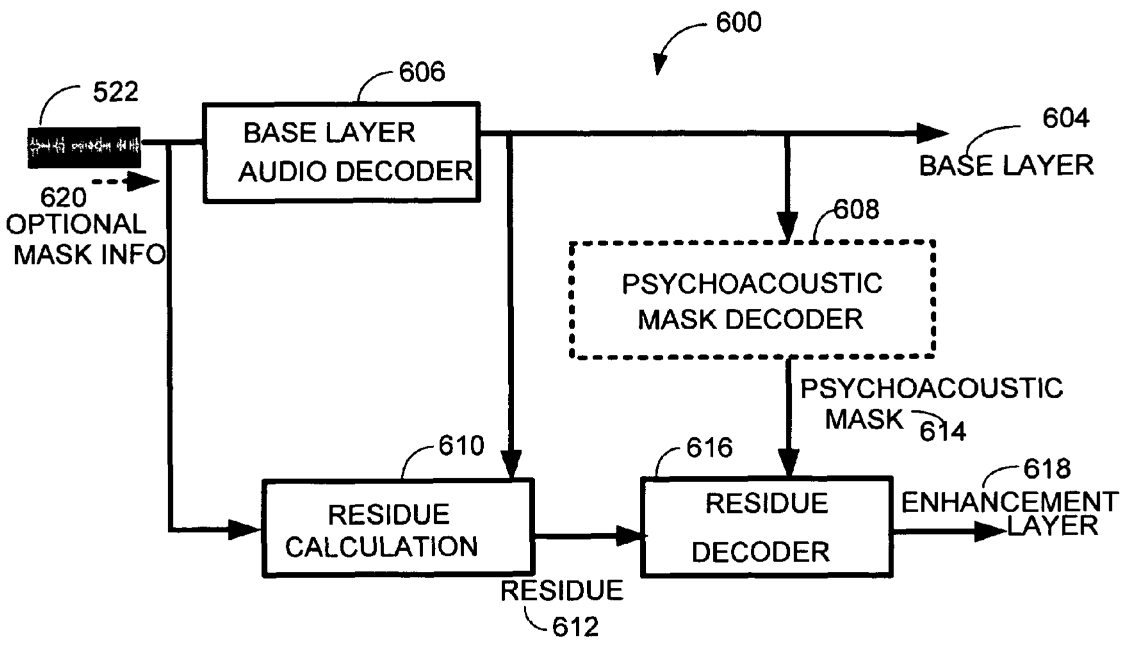
FIG. 6 depicts an exemplary system diagram of one embodiment of the present perceptual scalable audio decoder.

One exemplary embodiment of the perceptual scalable audio decoder 600 is shown in FIG. 6. The perceptual scalable audio bitstream 522 is input into the decoder. The same psychoacoustic mask 614 is extracted from the decoded base layer bitstream 604 of the perceptual scalable audio bitstream and is used to perceptually decode the residue 612. Compared with not using psychoacoustic information in the coding of residue, the perceptual scalable audio coder 500 and the perceptual scalable audio decoder 600 provide much better perceptual coding quality for the enhancement layer coding.

Figure 7:
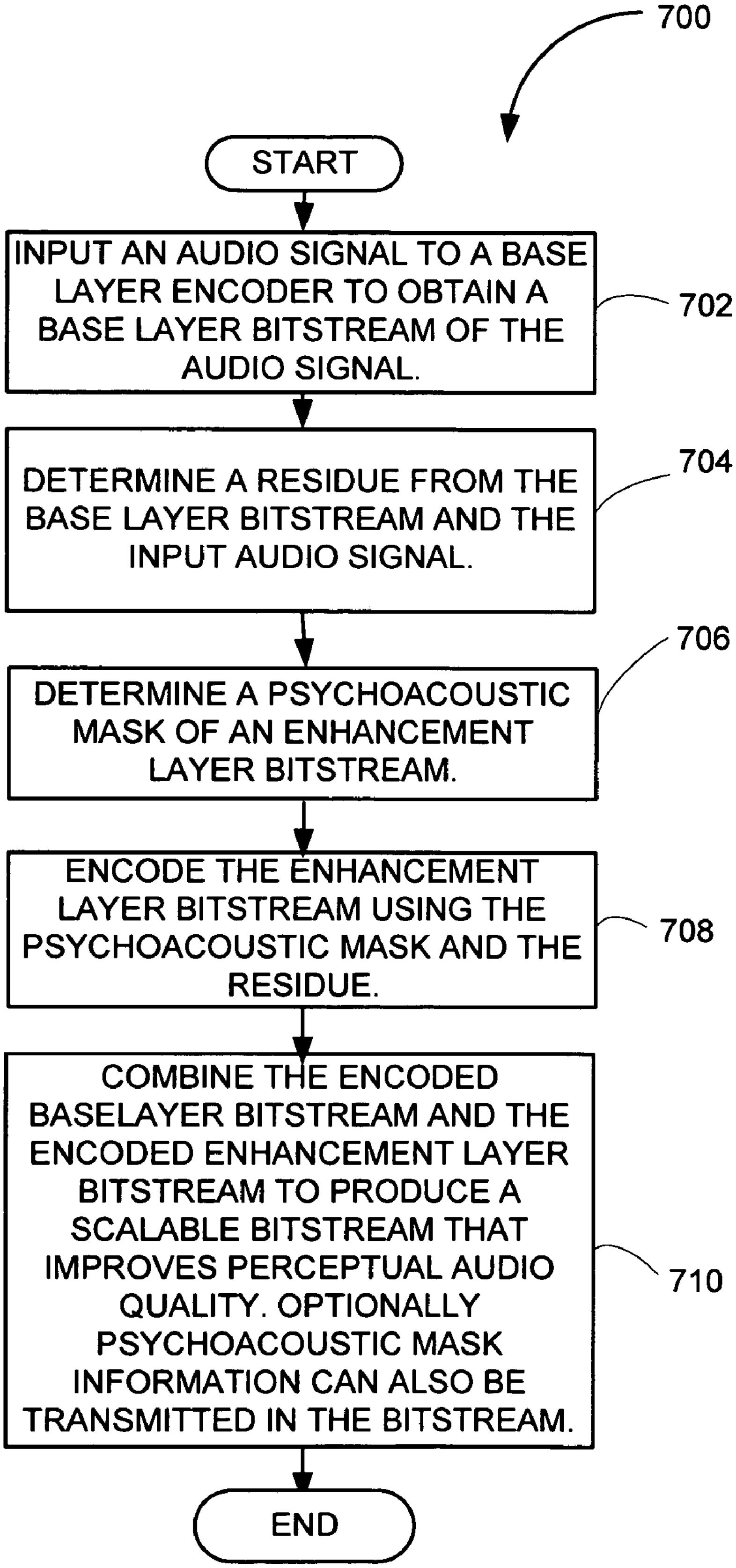
FIG. 7 is a general flow diagram showing the operation of an exemplary embodiment of the perceptual scalable audio coder.

More specifically, as shown in FIG. 7, the process of the encoding 700 by the perceptual scalable audio coder for one exemplary embodiment is as follows. An audio signal is input into a base layer encoder to obtain a base bitstream of the audio signal, as shown in process action 702. The base layer bitstream of the audio signal and the original audio signal are used to obtain a residue (process action 704). A psychoacoustic mask is determined from the coded base layer bitstream, as shown in process action 706. The enhancement layer bitstream is encoded using this psychoacoustic mask and the calculated residue, as shown in process 708. The encoded base layer bitstream and the encoded enhancement layer are then combined to produce a perceptual scalable audio bitstream that improves perceptual audio quality (process action 710). Optionally, psychoacoustic mask information can also be transmitted.

Figure 8:
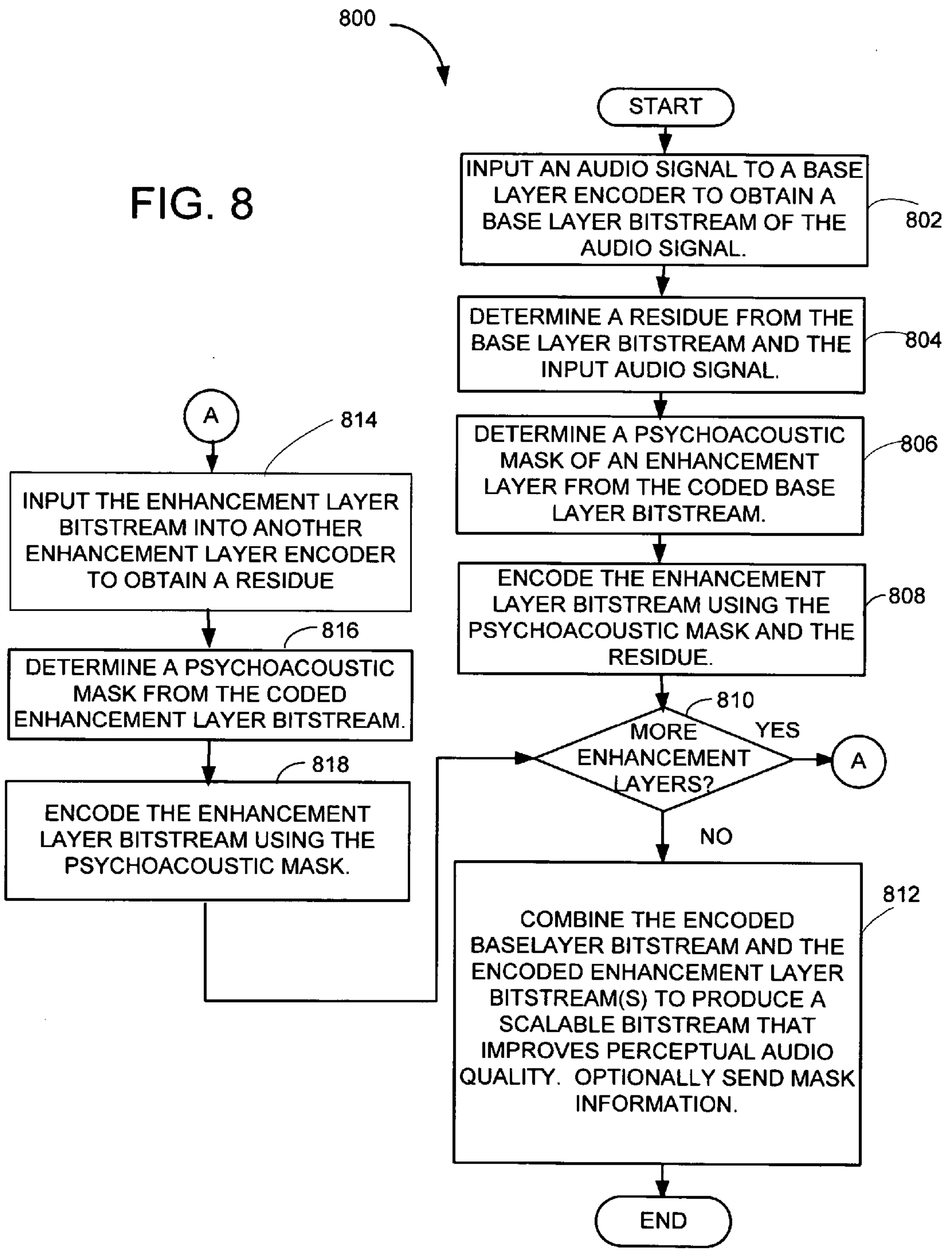
FIG. 8 is a general flow diagram showing the operation of an exemplary embodiment of the perceptual scalable audio coder, wherein there is more than one enhancement layer.

FIG. 8 provides an exemplary embodiment of the perceptual scalable audio coder 800 that encodes more than one enhancement layer to create the perceptual scalable audio bitstream. The audio signal is input into the base layer encoder to obtain a base layer bitstream, as shown in process action 802. The coded base layer bitstream and the original audio signal are input into the enhancement layer encoder to obtain a residue (process action 804). A psychoacoustic mask is determined from the coded base layer bitstream, as shown in process action 806. The enhancement layer bitstream is encoded using this psychoacoustic mask and the calculated residue, as shown in process 808. A check is then made to determine if there are any more enhancement layers, as shown in process action 810. If not, the encoded base layer bitstream and the encoded enhancement layer are then combined to produce a perceptual scalable audio bitstream that improves perceptual audio quality. Optionally, psychoacoustic mask information can also be transmitted (process action 810). If there are more enhancement layers, the next enhancement layer is input into another enhancement layer encoder to obtain a residue, as shown in process action 814. Psychoacoustic mask information is determined from the previous enhancement layer bitstream (process action 816). The enhancement layer bitstream is then encoded using the psychoacoustic mask and residue, as shown in process action 818. This process repeats until all enhancement layers are processed and then the encoded base layer bitstream and the one or more enhancement layers are encoded to produce a perceptual scalable audio bitstream that improves perceptual audio quality (process actions 810 and 812).

Figure 9:
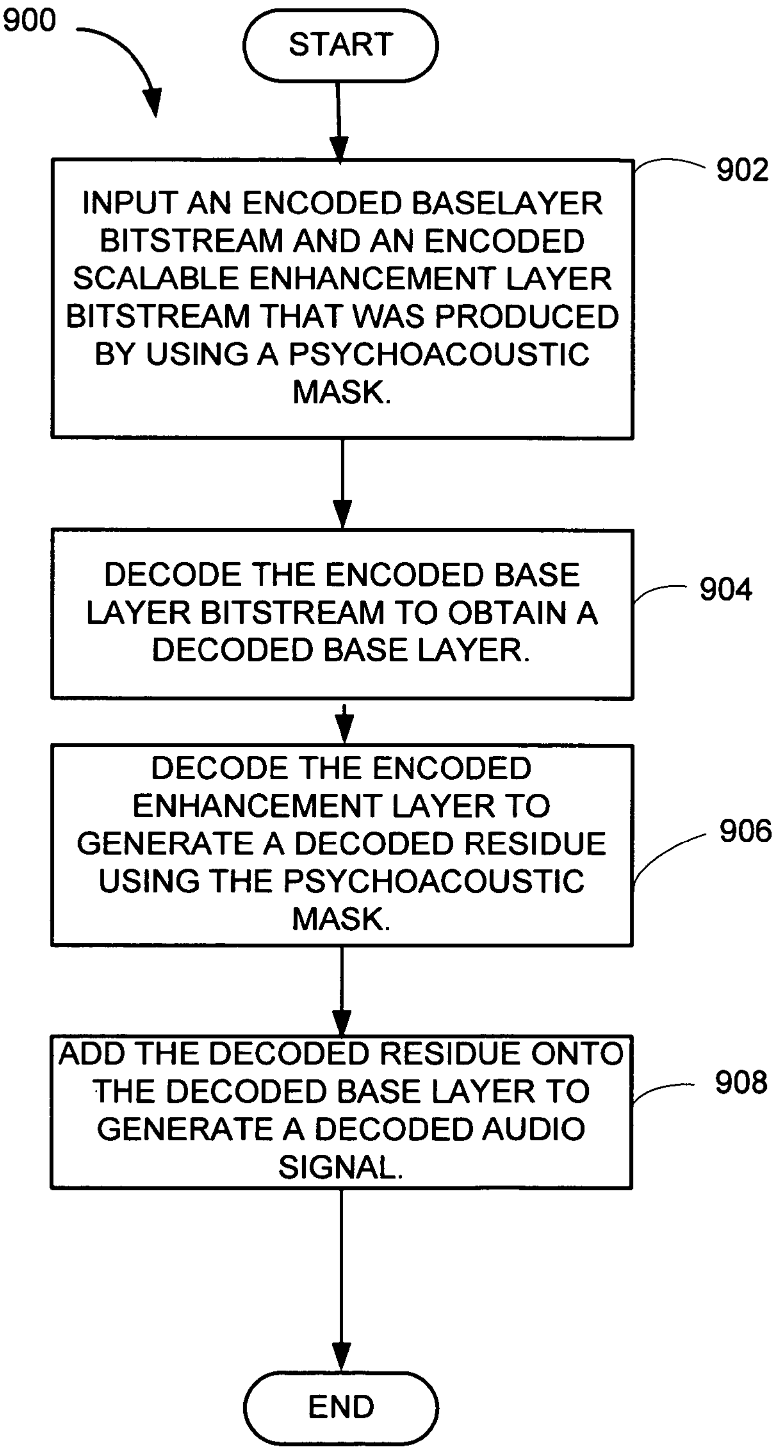
FIG. 9 depicts a general flow diagram of the process employed by one embodiment of the perceptual scalable audio decoder in decoding an enhanced perceptual scalable audio bitstream.

FIG. 9 provides an exemplary embodiment 900 of the processing of the perceptual scalable audio decoder. The encoded perceptual scalable audio bitstream is input into the decoder, as shown in process action 902. The encoded base layer bitstream is decoded to obtain a decoded base layer (process action 904). The encoded enhancement layer is decoded to generate the decoded residue using the psychoacoustic mask (process action 906). The decoded residue is added onto the decoded base layer to generate the decoded audio signal, as shown in process action 908.

If there are multiple enhancement layers in the perceptual encoded perceptual audio bitstream, the process actions of decoding the encoded base layer bitstream and determining the residue by decoding the enhancement layer are performed (process actions 902 and 904). Subsequent enhancement layers are then decoded by processing each enhancement layer bitstream in a manner similar to the way the base layer bitstream is decoded. That is, the previous enhancement layer bitstream is processed as the base layer bitstream to obtain the current decoded enhancement layer bitstream and associated residue. The residues for each of the enhancement layers are then added to the decoded base layer to obtain the decoded audio signal.

The perceptual scalable audio coding and decoding technique is rather flexible. It may use existing audio coding modules for the base layer coder, the generation of residue, and the coding of residue. For example, the base layer coder can be a transform based coder, such as AAC, Siren, or a CELP based speech coder (e.g., Adaptive Multi-Rate Wideband (AMR-WB)). To encode the residue, the perceptual scalable audio coder may fully decode the base layer audio bitstream, subtract the decoded audio waveform from the original audio waveform, and then encode the difference signal via a transform coder. Some of the above steps may be omitted if the transform used by the base layer coder is compatible with the transform used in the enhancement layer coder. In such a case, the audio needs to be transformed only once using the transform in the enhancement layer coder. To calculate the residue, one may subtract the original audio transform coefficients from the entropy decoded coefficients. More advanced technology, e.g, "error mapping" adopted in MPEG SLS can be used to calculate the residue as well. The following paragraphs provide additional information on: 1) the extraction of the psychoacoustic mask from the base layer coded bitstream and construction of a psychoacoustic mask for the enhancement layer coder, and 2) the use of the psychoacoustic mask for the coding of the enhancement layer bitstream.

3.1 Psychoacoustic Mask for the Enhancement Layer.

Figure 10:
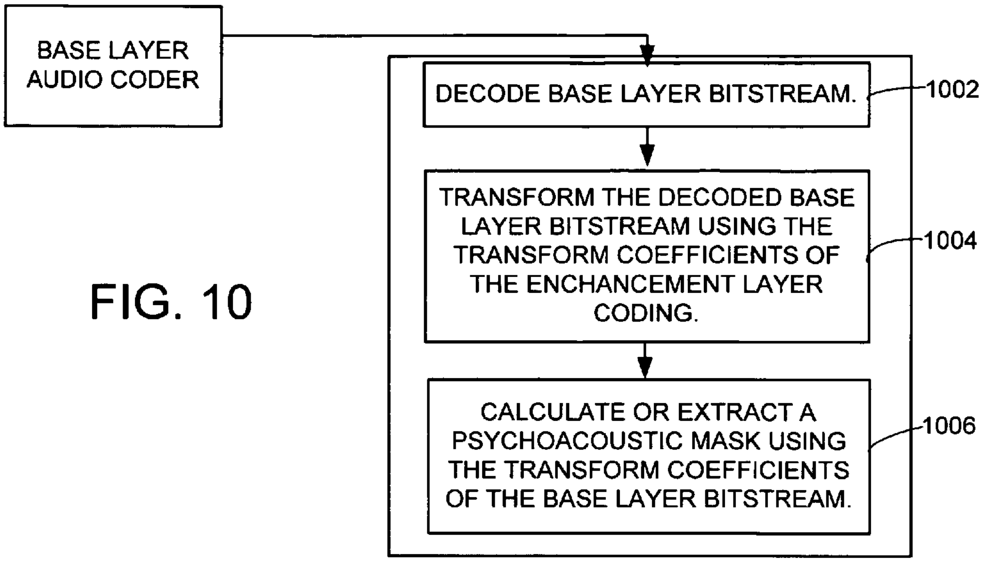
FIG. 10 depicts the extraction of a psychoacoustic mask in the case where the base layer of an audio signal does not have the psychoacoustic masking information.

If the enhancement layer coder works on the same frequency range as the base layer coder, a majority portion of the psychoacoustic mask used by the enhancement layer coder may be simply extracted from the base layer coded bitstream. If the base layer coder is a CELP based speech coder, or if the transform used by the base layer coder is incompatible with the transform used by the enhancement layer coder, the psychoacoustic information embedded in the base layer bitstream cannot be directly used by the enhancement layer coding. In such a case, as shown in FIG. 10, the perceptual scalable audio coder will first decode the base layer bitstream (process action 1002), and then re-transform the decoded base layer waveform via the transform used in the enhancement layer audio coding (process action 1004). The perceptual scalable audio coder may then extract or calculate a psychoacoustic mask according to the transform coefficients of the decoded base layer bitstream. In this approach, it is emphasized that the psychoacoustic mask is not calculated based upon the original audio waveform, but based on the decoded base layer bitstream (process action 1006). Because the above steps can be repeated by the decoder, the perceptual scalable audio decoder can recover the same psychoacoustic mask. As a result, there is no need to explicitly send the psychoacoustic mask to the decoder.

If the transform used by the base layer coder is compatible with the transform used by the enhancement layer coder, one may even skip the decoding and transforming module in FIG. 10. One simply needs to extract the decoded transform coefficients from the base layer coder, and then calculate the psychoacoustic masking accordingly. Because the decoded transform coefficients are used, the same psychoacoustic masking can be recalculated at the decoder end. As a result, there is again no need to explicitly send the the psychoacoustic mask to the decoder.

In order to prevent pre-echo situations, it may be necessary to send some specific information via the bitstream in order to properly evaluate the importance of spectral content in short-block coding.

If the base layer coder has psychoacoustic information that can be fully used or partially used by the enhancement layer coder, one may even skip the psychoacoustic masking calculation. In such a case, one simply extracts the psychoacoustic information from the coded base layer bitstream. Because the decoder can extract the same psychoacoustic information from the same coded base layer bitstream, there is again no need to explicitly send the send the psychoacoustic mask to the decoder.

It is common in scalable audio coding for the base layer to operate on a bandwidth restricted audio waveform, and let the enhancement layer to operate on wideband audio. In such case, whatever psychoacoustic information derived from the compressed bitstream of the base layer audio coder will miss the psychoacoustic information of the high frequency band. There are three possible ways for the enhancement layer audio coder to recover the psychoacoustic information of the high frequency band.

The first approach is to let the psychoacoustic masking threshold be a combination of the masking threshold of the low band spectral content and by the quiet threshold in the high band. This approach works well for scalable audio codec where the psychoacoustic masking threshold will be gradually refined. It does not work well if the psychoacoustic masking threshold is held constant during the scalable coding, as the initial threshold is not accurate.

Figure 11:
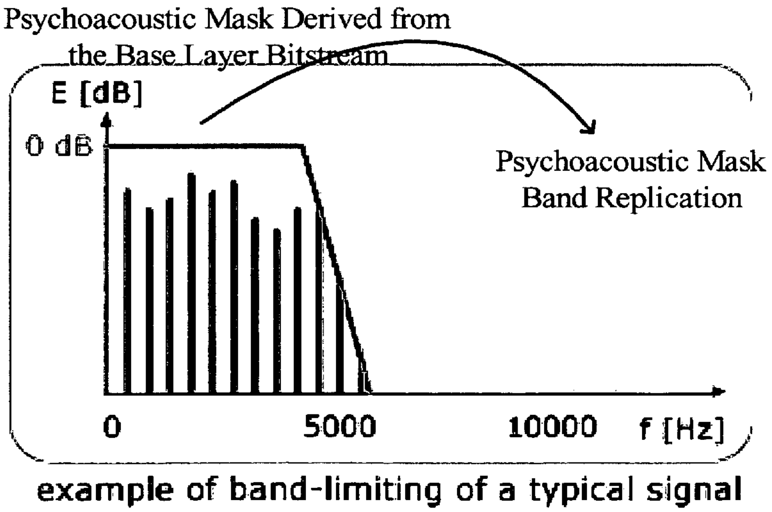
FIG. 11 depicts an exemplary chart wherein psychoacoustic mask information is recovered from a high frequency audio band for a base layer that operates on a bandwidth restricted audio waveform and an enhancement layer that operates on wideband audio.

The second approach is to predict the masking threshold in the high band via the knowledge of the low band signal. A predictor can be trained using sample audio signals and their full-band masking thresholds. The predictor learns mapping to the high band masking threshold based on the low band spectrum. The idea is similar to predicting linear prediction spectral parameters from low to high band. The methods probably work better for speech than generic audio. One calls this technology the psychoacoustic mask bandwidth prediction, as shown in FIG. 11. The advantage of the psychoacoustic mask bandwidth extension is that no psychoacoustic mask need be sent to the decoder in the enhancement layer, as the decoder may extract the psychoacoustic mask of the base layer bitstream, apply the same prediction as the encoder, and use mask bandwidth extension to obtain the psychoacoustic mask of the high frequency band, and use the mask for enhancement layer coding. The disadvantage is that the derived psychoacoustic mask for the high frequency band may not be accurate, which will hurt the perceptual quality of enhancement layer coding.

Figure 12:
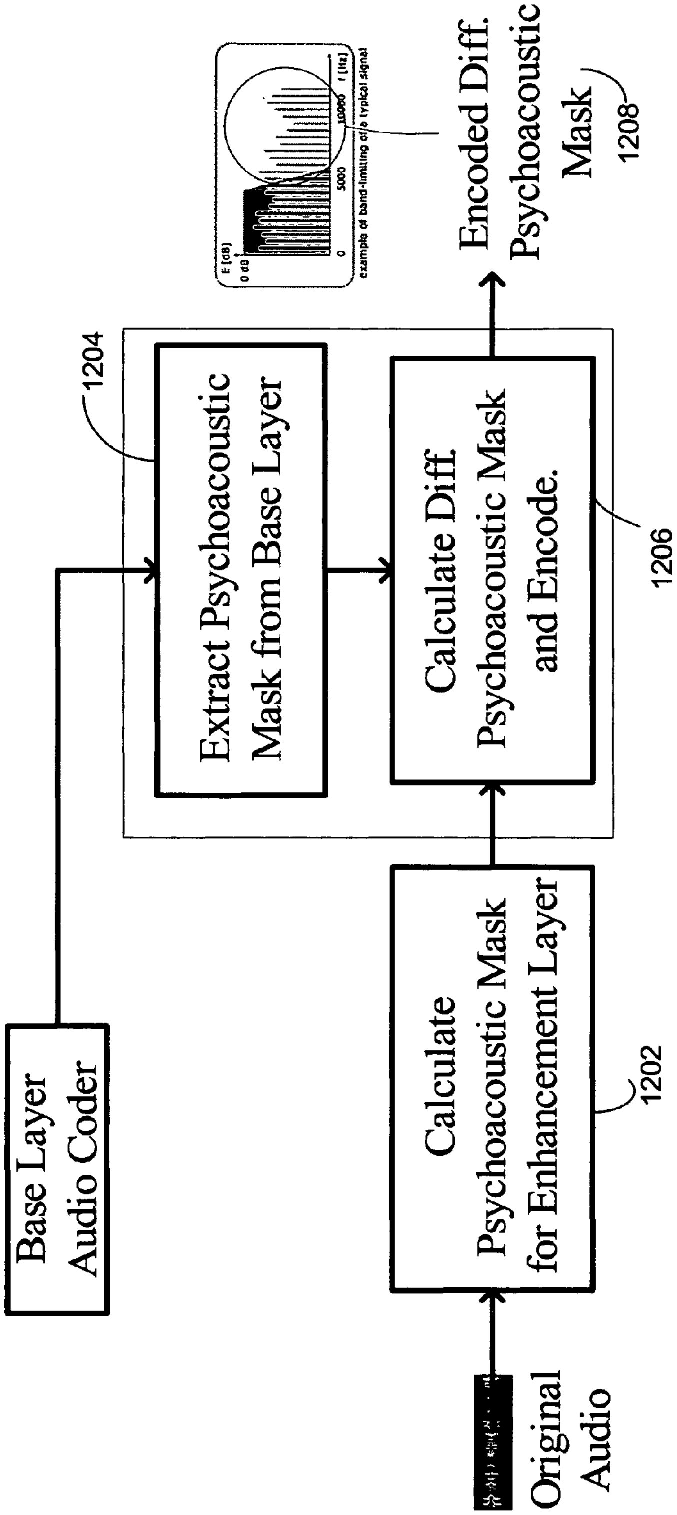
FIG. 12 depicts an exemplary flow diagram wherein differential psychoacoustic mask information is explicitly sent in the encoded enhanced perceptual scalable audio bitstream.

A third way of obtaining the psychoacoustic mask is to send extra information to describe the mask for the enhancement layer. The operation flow of such enhancement layer coder can be shown in FIG. 12. The psychoacoustic mask module in the enhancement layer coder calculates a new psychoacoustic mask for the enhancement layer coder from the original audio waveform, as shown in process action 1202. This psychoacoustic mask is compared to the psychoacoustic mask extracted from the base layer bitstream and the difference is determined (process actions 1204 and 1206). The difference of the two psychoacoustic masks is encoded and sent to the decoder (process action 1208). Note that the psychoacoustic mask extracted from the base layer bitstream may be enhanced using the predictive technology above before taking the difference. A majority of the difference may be for the extra high frequency region covered by the enhancement layer coder. However, the perceptual scalable audio coder may optionally encode and send mask improvement information for the frequency region of the base layer coder, in the case the low band is also enhanced. In this case, the decoder first extracts the psychoacoustic mask of the base layer bitstream and may enhance it using added bits. Then, the resultant mask is added to the decoded difference to recover the psychoacoustic mask used by the enhancement layer coder. The reconstructed psychoacoustic mask may then be used for enhancement layer coding.

In general, the encoding of the mask difference information need not be performed in the transform domain in which the mask is defined. The mask can be transformed to another domain for the purpose of coding. For instance, the mask may be represented using a set of all-pole filter coefficients, so that mask coding is performed in some linear-prediction parameter domain.

Another approach to this kind of perceptual scaling is to send new perceptual information in the stream whenever it is advantageous to enhance the codec's performance. This means that the encoder can assign perceptual gain values to both new perceptual (scale factor) and error-coding data. In such a case, the truncation of the enhancement layer data will still represent a substantially effective scalable coder.

3.2 Perceptual Scalable Coding for the Enhancement Layer.

With the psychoacoustic mask of the enhancement layer established, the perceptual scalable audio coder may proceed with the operation of perceptual coding of the enhancement layer audio signal. This can be done in one of two ways.

Figure 13:
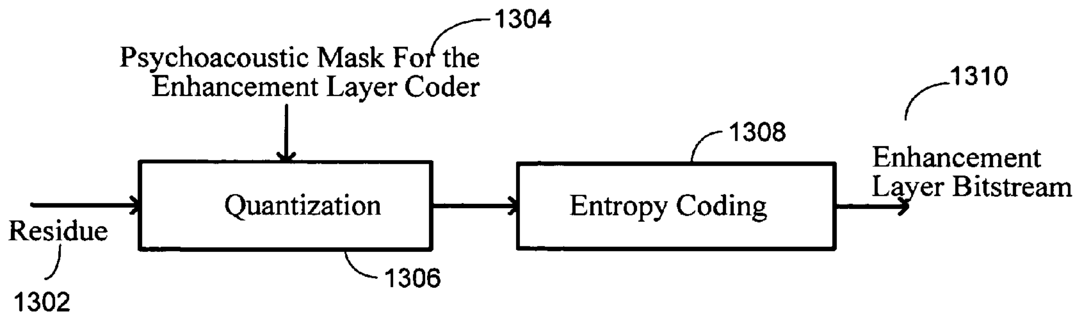
FIG. 13 depicts an exemplary flow diagram showing the quantization by the psychoacoustic mask and coding of the residue in one embodiment of the perceptual scalable audio coder.

The psychoacoustic mask of the enhancement layer may be used to quantize the residue. For those coefficients that correspond to a smaller psychoacoustic mask level, and are thus perceptually sensitive to errors, a smaller quantization step size is preferably used. For those coefficients that correspond to a larger psychoacoustic mask level, and are thus insensitive to errors, a larger quantization step size can be used. Because the quantization step size is derived from the psychoacoustic mask, there is no need to explicitly send the quantization step size information if the psychoacoustic mask is already available. Alternatively, for the method wherein extra difference information is to be sent for the psychoacoustic mask (as shown, for example, in FIG. 13), one may choose to send the difference information as quantization step sizes. In this case, the residue 1302 and psychoacoustic mask for the enhancement layer coder is input into a quantization module 1306. The quantized residue is then entropy coded via an entropy coding module 1308 and output with the enhancement layer bitstream. The quantized residue may be encoded by mature entropy coding technologies. If only Large Step scalability is desired, and thus the enhancement layer bitstream will not be truncated later, one may encode the quantized residue with a run-level Huffman coding. If fine-grain scalability is required and the enhancement layer bitstream may be truncated later, one may encode the quantized residue with a bitplane or sub-bitplane entropy coder. Both of the above entropy coding technologies are well-known in the trade.

Figure 14:
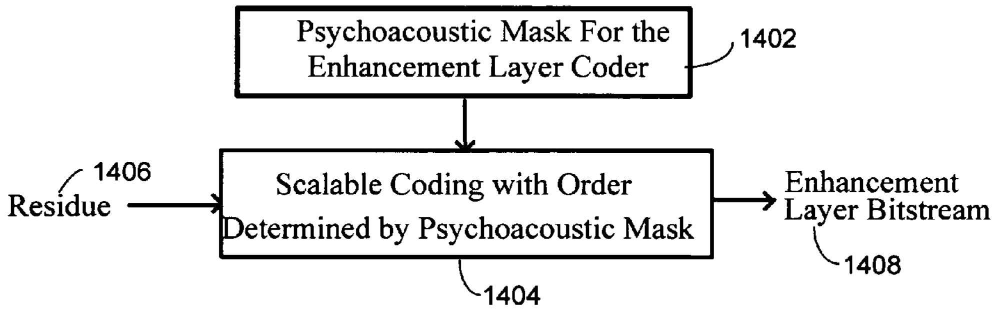
FIG. 14 depicts an exemplary flow diagram wherein entropy coding order is determined by using a psychoacoustic mask.

Alternatively, one may choose to use the psychoacoustic mask of the enhancement layer to guide the order of scalable coding. The approach is similar to the one adopted by the Embedded Audio Coding (EAC) scheme and shown in FIG. 14. The psychoacoustic mask obtained through the procedure of Section 3.1 serves as the initial psychoacoustic mask 1402. The perceptual scalable audio coder 1404 decomposes the residue 1406 to be coded in the enhancement layer into individual bits. The bits of the coefficients with a smaller psychoacoustic mask level, and are thus perceptually sensitive to errors, are encoded first. The bits of the coefficients with a larger psychoacoustic mask level, and are thus relatively insensitive to errors, are encoded later. These encoded bits are sent out in the enhancement layer bitstream 1408. There are three major advantages of using the psychoacoustic mask to guide the order of the scalable coding. Because no explicit coefficient quantization is used in such approach, one may easily design a perceptual scalable entropy coder that scales all the way to lossless. One may also gradually improve the psychoacoustic mask during the scalable coding process, in effect using the information of the coded coefficients to derive a new psychoacoustic mask to replace the initial psychoacoustic mask. Because the psychoacoustic mask can be improved, one can also afford to use a less accurate psychoacoustic mask in the beginning, and may thus eliminate the need to send the difference of the psychoacoustic mask for the enhancement layer coder. The disadvantage of the approach is that it will be slightly more complex than the quantization and entropy coding approach adopted in FIG. 13.

It should be noted that any or all of the aforementioned alternate embodiments may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A process for encoding an audio signal, comprising the process actions of:

using a computing device for:

inputting an audio signal and obtaining a base layer bitstream of the audio signal;

using the base layer bitstream of the audio signal and the input audio signal to obtain a residue;

determining a psychoacoustic mask of an enhancement layer bitstream;

encoding the enhancement layer bitstream using the psychoacoustic mask and the residue; and producing a scalable bitstream that improves perceptual audio quality of the audio signal using the encoded base layer bitstream and encoded enhancement layer bitstream, wherein the psychoacoustic mask of the enhancement layer is used to guide the order of coding bits of the scalable bitstream, comprising the process actions of:

(a) inputting the psychoacoustic mask obtained from the coded base layer bitstream;

(b) dividing the residue of the enhancement layer bitstream into individual bits;

(c) encoding a set of bits that correspond to smaller psychoacoustic mask levels of the input psychoacoustic mask;

(d) encoding a set of bits that correspond to larger psychoacoustic mask levels of the input psychoacoustic mask; and (e) repeating process actions (c) and (d) until a prescribed bitrate or distortion level is reached or all bits have been encoded.

2. The process of claim 1 further comprising encoding more than one enhancement layer wherein each enhancement layer bitstream is encoded by using the base layer and all previous enhancement layer bitstreams, calculating the residue and psychoacoustic mask therefrom, and generating another enhancement layer bitstream to produce a scalable bitstream using more than one encoded enhancement layer and the base layer bitstream to improve the perceptual quality of the audio signal.

3. The process of claim 1 wherein psychoacoustic mask information is explicitly included with the base layer bitstream.

4. The process of claim 1 wherein the psychoacoustic mask is calculated from a decoded audio waveform of the base layer bitstream.

5. The process of claim 1 wherein psychoacoustic mask is calculated using a waveform of the residue, and the psychoacoustic mask can be sent to a decoder.

6. The process of claim 1 wherein if a transform is used to encode the base layer bitstream, the transform is incompatible with a transform used to encode the enhancement layer bitstream and wherein the psychoacoustic mask is determined by the process actions of:

decoding the encoded base layer bitstream;

transforming coefficients of the decoded base layer bitstream via a transform used in the enhancement layer encoding; and calculating the psychoacoustic mask using the transform coefficients of the decoded base layer bitstream that were transformed using the transform used in the enhancement layer coding.

7. The process of claim 1 wherein the base layer bitstream is operating on a restricted bandwidth and the enhancement layer bitstream is operating on wide bandwidth, and wherein the psychoacoustic mask is obtained by using psychoacoustic masking information of the base layer bitstream to derive the psychoacoustic mask of the wide bandwidth.

8. The process of claim 1 wherein the base layer bitstream is operating on a restricted bandwidth and the enhancement layer bitstream is operating on wide bandwidth, and wherein the psychoacoustic mask is obtained by the process actions of:

calculating a new psychoacoustic mask for the enhancement layer bitstream from the original input audio signal;

comparing the psychoacoustic mask for the enhancement layer bitstream to the psychoacoustic mask extracted from the base layer bitstream to obtain a difference;

encoding the difference between the psychoacoustic mask calculated by the enhancement layer bitstream and the psychoacoustic mask extracted from the base layer bitstream; and sending the encoded difference in the scalable bitstream.

9. The process of claim 1 wherein the enhancement layer bitstream is encoded by:

using the psychoacoustic mask to determine a quantization step size of the residue;

quantizing the residue; and entropy coding the quantized residue.

10. The process of claim 1 wherein the psychoacoustic mask of the enhancement layer is used to guide the order of coding bits of the scalable bitstream.

11. The process of claim 10 wherein guiding the order of the scalable bits further comprises the process action of:

updating the psychoacoustic mask after a set of bits has been encoded.

12. A computer-readable storage medium having computer-executable instructions for performing the process recited in claim 1.

13. A process for decoding an audio signal, comprising the process actions of:

using a computing device for:

inputting an encoded base layer bitstream;

inputting an encoded scalable enhancement layer bitstream that was produced by using a psychoacoustic mask of the enhancement layer wherein the psychoacoustic mask of the enhancement layer was used to guide the order of coding bits of the scalable bitstream, comprising the process actions of:

(a) inputting the psychoacoustic mask obtained from the coded base layer bitstream;

(b) dividing a residue of the enhancement layer bitstream into individual bits;

(c) encoding a set of bits that correspond to smaller psychoacoustic mask levels of the input psychoacoustic mask;

(d) encoding a set of bits that correspond to larger psychoacoustic mask levels of the input psychoacoustic mask; and (e) repeating process actions (c) and (d) until a prescribed bitrate or distortion level is reached or all bits have been encoded;

decoding the encoded base layer to obtain a decoded base layer;

decoding the enhancement layer bitstream to generate a decoded residue using the psychoacoustic mask; and adding the decoded residue onto the decoded base layer to generate a decoded audio signal.

14. The process of claim 13 further comprising decoding more than one enhancement layer wherein each enhancement layer bitstream is decoded by using the base layer bitstream and all previous enhancement layer bitstreams, calculating the psychoacoustic mask and generating a residue there from, and adding each decoded residue onto the decoded base layer to generate the decoded audio signal.

15. A computer-readable storage medium having computer-executable instructions for performing the process recited in claim 13.

16. A system for improving the perceptual audio quality of an audio signal, comprising:

a general purpose computing device;

a computer program comprising program modules executable by the general purpose computing device, wherein the computing device is directed by the program modules of the computer program to, (a) input an audio signal to a base layer encoder to obtain a base layer bitstream of the audio signal;

(b) calculate the difference between the input audio signal and the decoded base layer bitstream to obtain a residue;

(c) determine a psychoacoustic mask of an enhancement layer bitstream wherein the psychoacoustic mask is determined by the process actions of:

decoding the encoded base layer bitstream;

transforming coefficients of the decoded base layer bitstream via a transform used in the enhancement layer encoding; and calculating the psychoacoustic mask using the transform coefficients of the decoded base layer bitstream that were transformed using the transform used in the enhancement layer coding;

(d) encode the residue to obtain a first enhancement layer bitstream;

(e) use the base layer and first enhancement layer bitstream as a new base layer;

(f) calculate the difference between the new base layer and the input audio signal to obtain a residue of the second enhancement layer;

(g) determine a psychoacoustic mask of the second enhancement layer;

(h) encode the residue to obtain the second enhancement layer bitstream; and (i) generate n additional enhancement layer bitstreams by repeating (e) through (h) for each nth enhancement layer; and (j) produce a scalable bitstream that improves perceptual audio quality of the signal using the encoded base layer bitstream and encoded enhancement layer bitstreams.

17. The system of claim 16 further comprising program modules to:

decode the encoded base layer bitstream and the encoded enhancement layer bitstreams by using psychoacoustic mask information and the residues, and add the decoded base layer and the residues together to form a decoded audio signal.

18. The system of claim 16 wherein the order of encoding bits of each enhancement layer bitstream is determined by using psychoacoustic mask information.

19. The system of claim 16 wherein each psychoacoustic mask is used to determine a quantization step size, each residue is quantized according to the quantization step size to form a quantized residue, and each quantized residue is entropy encoded.

* * * * *